United States Patent
Danelon et al.

(10) Patent No.: US 10,247,967 B2
(45) Date of Patent: Apr. 2, 2019

(54) OPTICAL MODULATOR HAVING MACH-ZEHNDER DIODES OF REDUCED LENGTH

(71) Applicant: STMicroelectronics SA, Montrouge (FR)

(72) Inventors: Valerie Danelon, Grenoble (FR); Denis Pache, Grenoble (FR)

(73) Assignee: STMICROELECTRONICS SA, Montrouge (FR)

( * ) Notice: Subject to any disclaimer, the term of this patent is extended or adjusted under 35 U.S.C. 154(b) by 0 days.

(21) Appl. No.: 15/689,167

(22) Filed: Aug. 29, 2017

(65) Prior Publication Data

US 2018/0196289 A1 Jul. 12, 2018

(30) Foreign Application Priority Data

Jan. 6, 2017 (FR) ..................... 17 50151

(51) Int. Cl.
*G02F 1/01* (2006.01)
*G02F 1/225* (2006.01)
(Continued)

(52) U.S. Cl.
CPC ........... *G02F 1/0123* (2013.01); *G02B 6/293* (2013.01); *G02F 1/025* (2013.01); *G02F 1/2255* (2013.01);
(Continued)

(58) Field of Classification Search
CPC ...... G02F 1/0123; G02F 3/026; G02F 1/2255; G02F 1/2257; G02F 1/025; H04B 10/50575; G02B 6/293
(Continued)

(56) References Cited

U.S. PATENT DOCUMENTS 9,128,308 B1 9/2015 Zortman et al.
2007/0230625 A1* 10/2007 Hironishi ............... H04B 10/66
375/329
(Continued)

FOREIGN PATENT DOCUMENTS

FR 3002654 A1 8/2014
JP 2013007987 A 1/2013

OTHER PUBLICATIONS

Spector, Steven J., et al., "Operation and Optimization of Silicon-Diode-Based Optical Modulators", IEEE Journal of Selected Topics in Quantum Electronics, vol. 16, No. 1, Jan./Feb. 2010, pp. 165-172.

*Primary Examiner* — Juan A Torres
(74) *Attorney, Agent, or Firm* — Slater Matsil, LLP

(57) ABSTRACT

A Mach-Zehnder modulator (MZM) includes a first optical path with a first diode coupled to a first voltage signal node and configured to modify a phase of a first light signal transmitted through the first optical path. A further diode is positioned in the first optical path and configured to introduce a phase shift to the first light signal. A second optical path includes a second diode coupled to a second voltage signal node and configured to modify a phase of a second light signal transmitted through the second optical path. A first voltage signal carried on the first voltage signal node and a second voltage signal carried on the second voltage signal node each vary between a reverse biasing voltage level and a forward biasing voltage level. An optical coupler is coupled to the first and second optical paths.

23 Claims, 4 Drawing Sheets

(51) Int. Cl.
 *G02B 6/293* (2006.01)
 *G02F 1/025* (2006.01)
 *G02F 3/02* (2006.01)
 *H04B 10/50* (2013.01)

(52) U.S. Cl.
 CPC ............ G02F 1/2257 (2013.01); G02F 3/026 (2013.01); H04B 10/50575 (2013.01)

(58) Field of Classification Search
 USPC ........................................................ 398/185
 See application file for complete search history.

(56) References Cited

U.S. PATENT DOCUMENTS

| | | |
|---|---|---|
| 2010/0128336 A1 | 5/2010 | Witzens et al. |
| 2010/0329696 A1* | 12/2010 | Yu ...................... H04B 10/5053 398/188 |
| 2014/0241657 A1* | 8/2014 | Manouvrier ..... H04B 10/50575 385/3 |
| 2015/0316829 A1 | 11/2015 | Kazmierski et al. |
| 2016/0103382 A1* | 4/2016 | Liboiron-Ladouceur .................... H04B 10/516 385/3 |
| 2016/0218811 A1* | 7/2016 | Chen ................. H04B 10/5561 |
| 2017/0003571 A1* | 1/2017 | Carpentier ............ G02F 1/2255 |
| 2017/0199399 A1 | 7/2017 | Manouvrier |
| 2017/0288781 A1* | 10/2017 | Carpentier .......... H04L 25/4917 |

\* cited by examiner

OPTICAL MODULATOR HAVING MACH-ZEHNDER DIODES OF REDUCED LENGTH

CROSS-REFERENCE TO RELATED APPLICATIONS

This application claims priority to French Patent Application No. 1750151, filed on Jan. 6, 2017, which application is hereby incorporated herein by reference.

TECHNICAL FIELD

The present disclosure relates to the field of optical modulators, and in particular to the field of Mach-Zehnder modulators (MZM).

BACKGROUND

A Mach-Zehnder modulator (MZM), also known as a Mach-Zehnder interferometer (MZI), is an optical modulator based on interference between two out-of-phase optical signals combined by an optical coupler. In particular, the optical power in each output branch of the optical coupler will depend on the amount of phase difference between the optical signals at the input of the coupler.

In order to provide a variable phase difference between the optical signals, it has been proposed to propagate the optical signals through diodes across which a biasing voltage is applied, the phase shift of each optical signal being a function of the applied voltage level. In this way, a voltage signal applied to the diodes can be used to generate a modulated optical signal.

The successful demodulation of the optical signal at the receiver will depend on the extinction ratio of the optical signal, in other words the difference in the light intensity between different levels of the optical signal. In existing MZMs, in order to provide a phase difference between the optical signals that is sufficiently high to achieve a good extinction ratio, it is generally necessary to provide relatively long diodes, for example of between 2 and 3 mm in length. However, the use of relatively long diodes has drawbacks in terms of surface area and energy consumption.

There is thus a need in the art for an optical modulator permitting diodes of reduced length to be used while maintaining a relatively high extinction ratio of the resulting optical signal.

SUMMARY

Embodiments of the present disclosure at least partially address one or more needs in the prior art.

According to one aspect, there is provided a Mach-Zehnder modulator (MZM). A first optical path comprises a first diode adapted to receive a first voltage signal for modifying a phase of a first light signal transmitted through the first optical path. A second optical path comprises a second diode adapted to receive a second voltage signal for modifying a phase of a second light signal transmitted through the second optical path. The first and second voltage signals each vary between a reverse biasing voltage level and a forward biasing voltage level. An optical coupler is configured to couple the first and second optical paths. A further diode is positioned in the first optical path and configured to introduce a phase shift to the first light signal.

According to one embodiment, the MZM further comprises a drive circuit adapted to generate the first and second voltage signals, the drive circuit being adapted to generate the forward biasing voltage level to be higher than 0 V and lower than a threshold voltage of the first and second diodes.

According to one embodiment, the first and second optical paths are arranged such that, in the absence of the first and second voltage signals, the further diode provides the only phase variation, introduced by the first and second optical paths, between the first and second light signals.

According to one embodiment, the further diode is configured to introduce a phase shift of between 10 and 80°.

According to one embodiment, the further diode is configured to introduce a phase shift of between 10 and 65°.

According to one embodiment, each of the first and second diodes has a length of between 200 and 1100 μm.

According to one embodiment, the further diode has a length of between 50 and 400 μm.

According to one embodiment, the MZM further comprises a further optical coupling providing the first light signal to the first optical path and the second light signal to the second optical path.

According to one embodiment, the MZM further comprises a control circuit for generating a biasing voltage for controlling the phase shift introduced by the further diode.

According to one embodiment, the control circuit is configured to generate the biasing voltage based on at least one output signal of the optical coupler.

According to a further aspect, there is provided an optical link comprising: the above MZM; and an optical channel coupled to an output of the optical coupler.

According to a further aspect, a method of optical modulation comprises applying, to a first diode of a Mach-Zehnder modulator, a first voltage signal for modifying a phase of a first light signal transmitted through a first optical path. The first optical path further comprises a further diode configured to introduce a phase shift to the first light signal. The method also comprises applying, to a second diode of the Mach-Zehnder modulator, a second voltage signal for modifying a phase of a second light signal transmitted through a second optical path. The first and second voltage signals each vary between a reverse biasing voltage level and a forward biasing voltage level. The first and second optical paths are coupled by an optical coupler.

BRIEF DESCRIPTION OF THE DRAWINGS

The foregoing and other features and advantages will become apparent from the following detailed description of embodiments, given by way of illustration and not limitation with reference to the accompanying drawings, in which.

DETAILED DESCRIPTION OF ILLUSTRATIVE EMBODIMENTS

The term "approximately" is used herein to designate a range of plus or minus 10 percent of the value in question.

Figure 1:
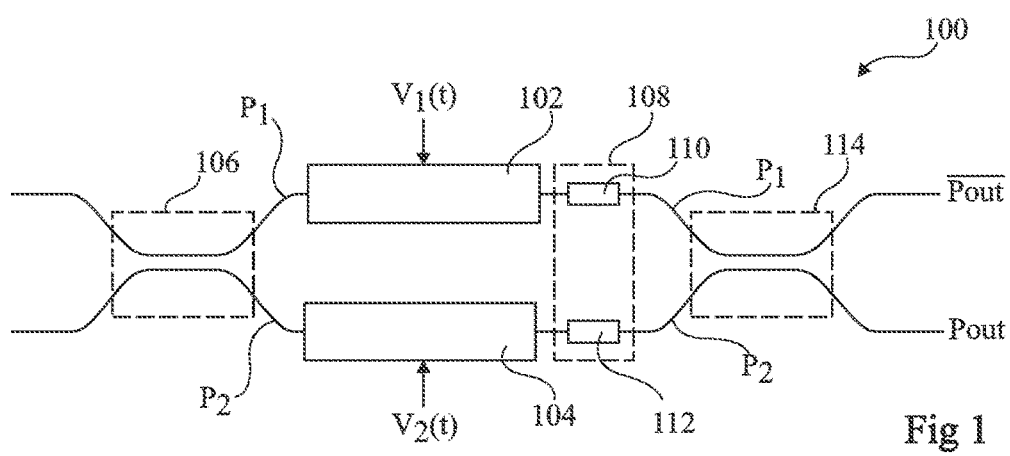
FIG. 1 schematically illustrates a Mach-Zehnder modulator (MZM) according to an example embodiment.

FIG. 1 schematically illustrates an MZM 100 according to an embodiment that has been proposed. The MZM 100 comprises an optical path P1 having a diode 102, and an optical path P2 having a diode 104. The diodes 102, 104 are respectively biased by voltage signals V1($t$) and V2($t$). The diodes 102, 104 are used to introduce a varying phase difference between the light signals in the optical paths P1, P2, and such diodes will be referred to herein as MZ (Mach-Zehnder) diodes. A light source signal is provided to the MZ diodes 102 and 104 via an optical coupler 106, which for example provides light signals to the first and second optical paths P1, P2 having a phase difference of $\pi/2$ radians. A phase modification device 108 is coupled to the outputs of the MZ diodes 102 and 104, and adds a default phase shift of $\pi/2$ radians between the optical paths in the absence of any phase difference applied by the MZ diodes 102, 104. For example, the optical device 108 comprises diodes 110, 112 respectively configured to introduce phase shifts of $+\pi/4$ and $-\pi/4$. An optical coupler 114 couples the optical signals of the optical paths P1, P2 at the outputs of the diodes 110 and 112 in order to generate output optical signals Pout and $\overline{\text{Pout}}$, one of which for example provides the modulated output signal of the MZM 100 that can be transmitted over an optical link (not illustrated in FIG. 1) to a receiver.

Figure 2:
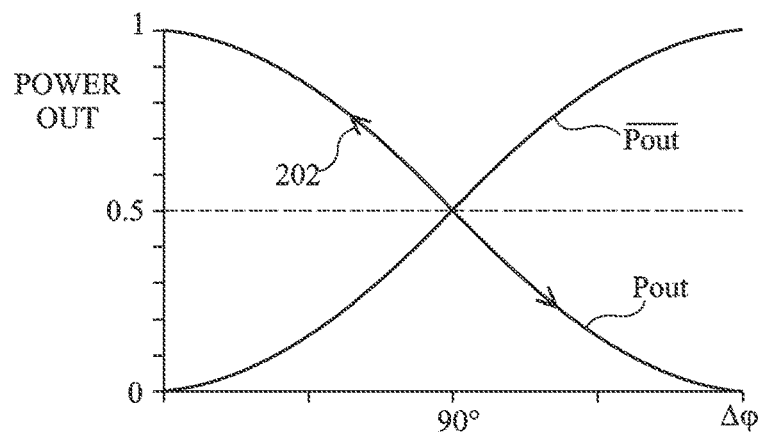
FIG. 2 is a graph representing the output transmission power of each output branch of the MZM of FIG. 1 as a function of the phase shift according to an example embodiment.

FIG. 2 is a graph representing the power of the output optical signals Pout and $\overline{\text{Pout}}$ of the MZM 100 of FIG. 1 as a function of the phase difference introduced by the optical paths P1 and P2. As illustrated, when the voltage signals V$_1$(t), V$_2$(t) are not applied, the default phase difference between the optical signals generated by the optical paths is for example approximately $\pi/2$ radians, in other words approximately 90°. At this phase difference, the output power is split substantially equally between the output signals Pout and Pout. As represented by an arrow 202 in FIG. 2, as the phase difference becomes lower than $\pi/2$ radians, the power of the optical output signal Pout increases towards a value of 1 representing the full power of the combined optical signals Pout, Pout, and as the phase difference becomes higher than $\pi/2$ radians, the power of the optical signal Pout decreases towards a value of 0.

The relation between the output power Pout and the phase difference $\Delta\varphi$ between the optical signals introduced by the optical paths P1 and P2 corresponds for example to Pout~$\cos 2(k\Delta\varphi)$, where k is an integer indicating modulo $2\pi$.

The phase shift $\Delta\varphi'$ introduced by each of the MZ diodes 102, 104 can for example be determined by the following expression:

$$\Delta\varphi' = \frac{2\cdot\pi}{\lambda_0}\cdot\Delta n\cdot l$$

where $\lambda_0$ is the wavelength of the optical signal, $\Delta n$ is the change in the refractive index of the material of the diode brought about by the voltage change, and l is the length of the diode.

Figure 3:
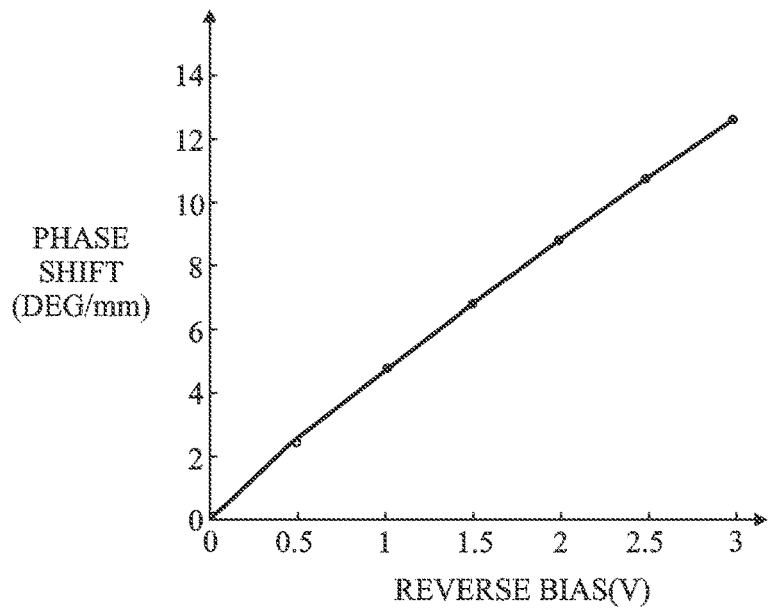
FIG. 3 is a graph illustrating an example of a phase shift applied to an optical signal by an MZ diode as a function of the reverse voltage according to an example embodiment.

FIG. 3 is a graph illustrating an example of the relationship between a reverse biasing voltage (REVERSE BIAS) applied to an MZ diode, and the resulting phase shift (PHASE SHIFT), in degrees per millimeter, of the optical signal passing through the diode. For example, a reverse biasing voltage of approximately 2 V results in a phase shift of approximately 9 degrees. Therefore, in order to achieve a phase difference $\Delta\varphi$ of +/−30° between the optical signals in the optical paths P1, P2 of the modulator, the MZ diodes 102, 104 in the embodiment of FIG. 1 for example each have lengths of approximately 3 mm.

Figure 4:
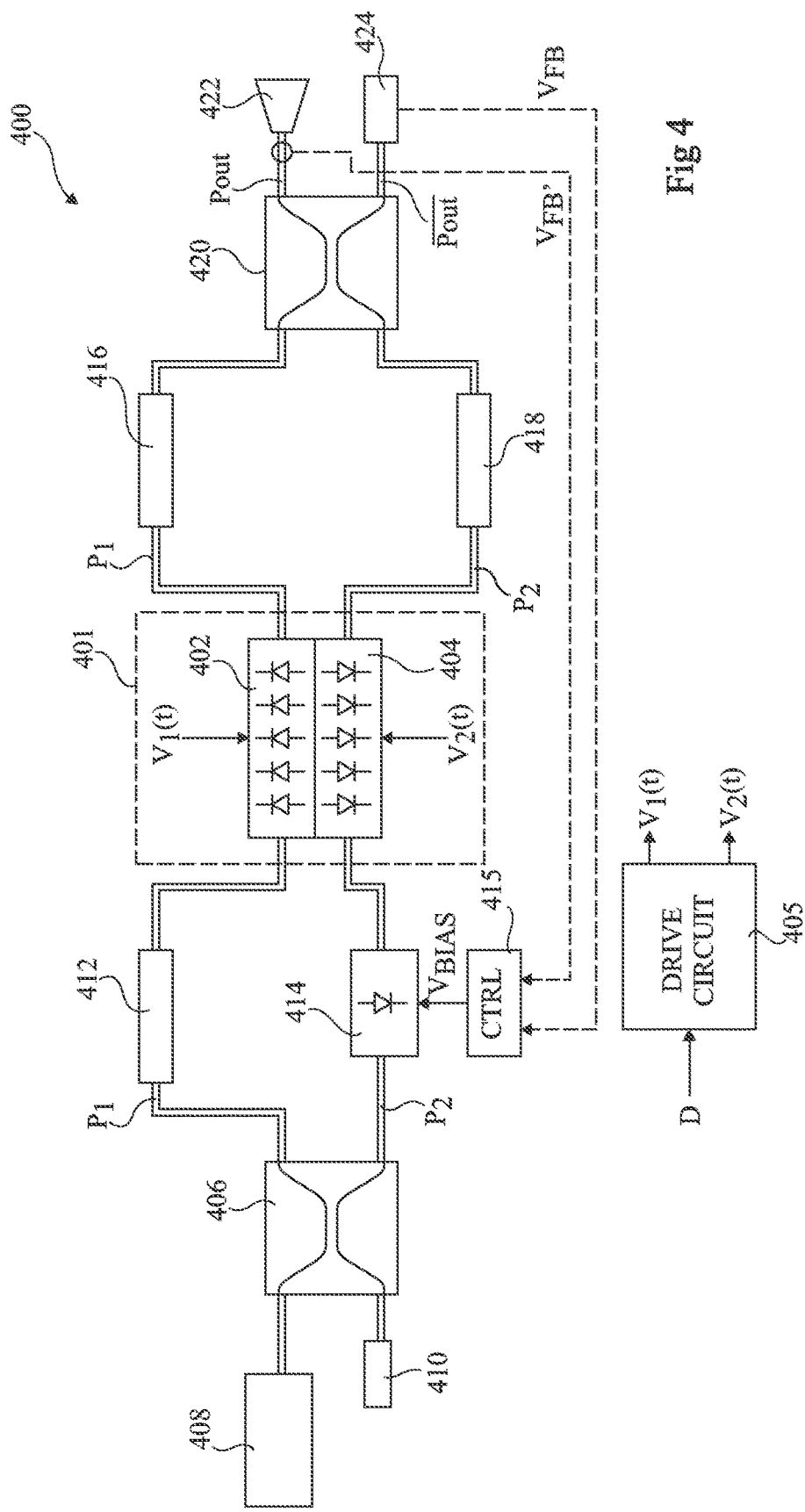
FIG. 4 schematically illustrates an optical modulator according to an example embodiment of the present disclosure.

FIG. 4 schematically illustrates an MZM 400 according to an example embodiment of the present disclosure. Optical signals on optical paths P1, P2 are phase-shifted by a pair of MZ diodes 401 based on voltage signals V1($t$), V2($t$) respectively. The MZ diodes are for example diodes known in the art as high speed phase modulation (HSPM) diodes, which allow the phase of the optical signal to be modified relatively quickly, particularly in reverse mode. The pair of MZ diodes 401 comprises an MZ diode 402 coupled in the optical path P1, and an MZ diode 404 coupled in the optical path P2. As represented in FIG. 4, each of the MZ diodes 402, 404 may be implemented by the parallel electrical connection of several diodes, each driven by the corresponding voltage signal V1($t$), V2($t$). The diodes forming each MZ diode 402, 404 are arranged along the corresponding optical path P1, P2, such that the optical signals pass through each diode. Each of the MZ diodes 402, 404 for example has a length, along its optical path, of between 200 and 1100 μm, and for example up to 1000 μm.

The voltage signals V1($t$) and V2($t$) are for example generated by a drive circuit 405 based on a data signal D to be modulated by the optical modulator.

The optical paths P1, P2 are supplied by an optical coupler 406, which for example has two inputs, one of which receives an optical signal from a laser source 408, and the other of which is coupled to an optical termination 410. Like the optical coupler 106 of FIG. 1, the optical coupler 406 for example provides optical signals to the optical paths having between them a phase difference of 90°.

The optical path P1 for example comprises a waveguide 412 positioned between one output of the optical coupler 406 and an input of the MZ diode 402. The optical path P2 for example comprises a diode 414 positioned between the other output of the optical coupler 406 and an input of the MZ diode 404. The diode 414 is for example a P-intrinsic-N phase modulation (PINPM) diode, having a slower response time than an HSPM diode. Indeed, a PINPM diode is capable of providing a relatively high phase variation in forward mode, but with a relatively low frequency response. The diode 414 for example introduces a phase shift of for example between 10° and 65° of the optical signal in the optical path P2, although in some embodiments it may provide an even higher phase shift, for example of up to 90°.

The diode 414 creates a dissymmetry between the optical paths P1, P2. The diode 414 is for example biased by a biasing voltage VBIAS, which may be a fixed voltage, or may be a variable voltage generated by a control circuit 415 based on a feedback path, as will be described in more detail below. The diode 414 for example has a length of between 50 and 400 μm.

The outputs of the MZ diodes 402, 404 are for example coupled via corresponding waveguides 416, 418 to an optical coupler 420, which provides modulated output signals Pout and $\overline{\text{Pout}}$. The output signal Pout is for example transmitted to an optical receiver (not illustrated) via an output element 422. In some embodiments, the output signal $\overline{\text{Pout}}$ is provided to an optical receiver 424, which converts the optical signal $\overline{\text{Pout}}$ into a voltage signal VFB provided to the control circuit 415, and the control circuit 415 adjusts the biasing voltage VBIAS of the diode 414 based on this feedback voltage. In some embodiments the control circuit 415 also receives a feedback voltage VFB', generated based on the output signal Pout. For example, a coupler is adapted to divert a small percentage of the power of the optical signal Pout to a further optical receiver (not illustrated in FIG. 4), which converts this signal into a voltage to provide the feedback voltage signal VFB'. For example, the control circuit 415 determines the difference in power between the signals Pout and $\overline{\text{Pout}}$, and adjusts the delay introduced by the diode 414 such that this difference is relatively high. Such a calibration is for example performed once following the fabrication of the modulator, and the biasing voltage VBIAS then for example remains fixed for the lifetime of the modulator, or could be recalibrated periodically.

While in the embodiment of FIG. 4 the diode 414 is positioned between the optical coupler 406 and the diode 404, in alternative embodiments it could be positioned elsewhere in the optical path $P_2$, for example replacing the waveguide 418.

Figure 5:
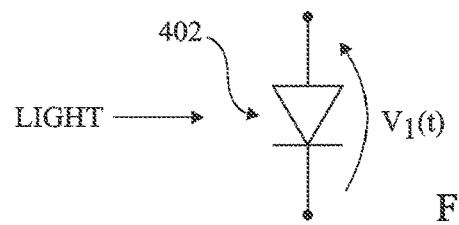
FIG. 5 schematically illustrates an MZ diode according to an example embodiment.

FIG. 5 schematically illustrates the MZ diode 402 of FIG. 4 according to an example embodiment. The voltage signal $V_1(t)$ is for example applied between the cathode and anode of the diode. The voltage signal $V_2(t)$ is for example applied to the MZ diode 404 in a similar fashion.

In some embodiments, the voltage signals $V1(t)$ and $V2(t)$ applied to the MZ diodes 402, 404 vary between negative and positive levels, such that these diodes are forward and reverse biased. If the diode is reverse biased, in other words the voltage signal V1(t) applied across diode is negative, there will be a carrier depletion in the diode, leading to an increased phase shift. If the diode is forward biased, in other words the voltage signal V1(t) applied across diode is positive, there will be carrier injection in the diode, leading to higher absorption and a corresponding phase shift. This will now be described in more detail with reference to FIGS. 6, 7A and 7B.

Figure 6:
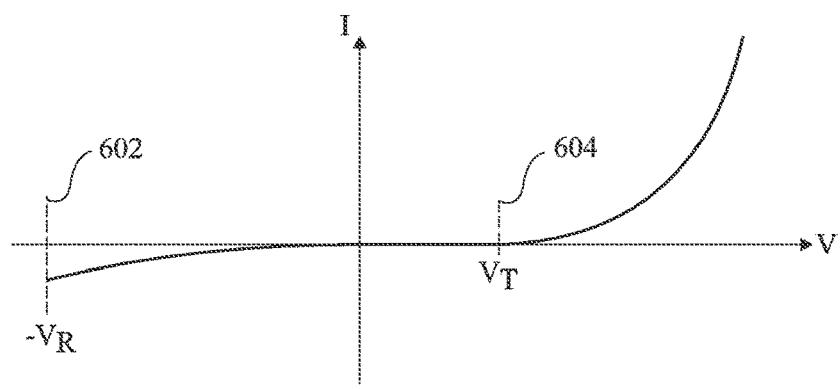
FIG. 6 is a graph illustrating current flow in an MZ diode as a function of the applied voltage according to an example embodiment.

FIG. 6 is a graph illustrating the current I through each of the MZ diodes 402, 404 as a function of voltage. The voltage signals V1(t) and V2(t) each for example vary between a reverse biasing voltage 602 equal to −VR and a forward biasing voltage 604 equal to VT, where VT is the threshold voltage of the MZ diode, equal for example to between 0.5 and 1 V. Rather than the forward biasing voltage 604 being at VT, it could be at a level of between 50% and 100% of VT, for example approximately 75% of VT. The reverse biasing voltage −VR is equal for example to between −1 and −3 V, and for example approximately −1.8 V.

Figure 7A:
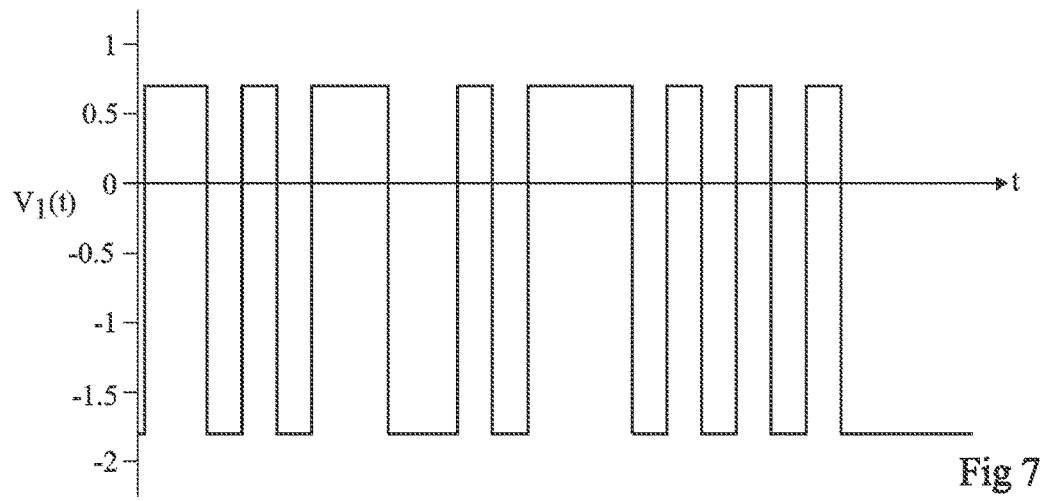
FIG. 7A is a graph illustrating an example of a voltage signal applied to an MZ diode according to an example embodiment.

FIG. 7A is a graph illustrating the voltage signal V1(t) according to an example in which the reverse biasing voltage −VR is at −1.8 V, and the forward biasing voltage is at 0.72 V. FIG. 7A assumes that an NRZ (non-return to zero) modulation scheme is used, and the signal is switched between the forward biasing level to transmit a "1" bit, and the reverse biasing level to transmit a "0" bit.

Figure 7B:
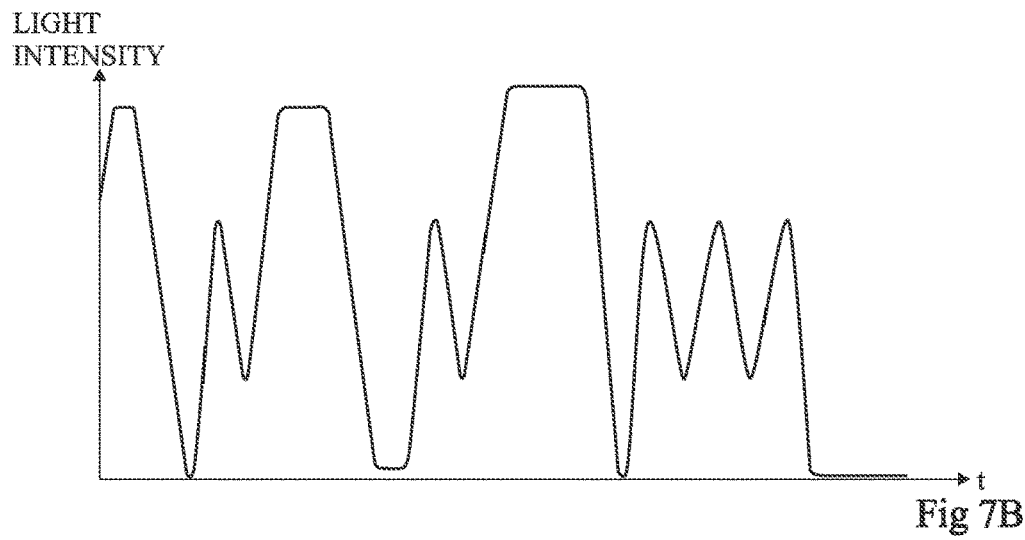
FIG. 7B is a graph illustrating an example of the light intensity resulting from the voltage signal of FIG. 7A according to an example embodiment.

FIG. 7B is a graph illustrating the light intensity resulting from the voltage signal of FIG. 7A applied to the MZ diode 402, and the inverse signal applied to the MZ diode 404.

As illustrated, peaks and troughs in the light intensity signal vary depending on the duration of the pulses at the forward biasing voltage level and reverse biasing voltage level.

The present inventors have found that the MZ modulator of FIG. 4 is capable of providing a relatively high extinction ratio, despite the relatively short length of the MZ diodes 402, 404. For example, providing the diode 414 having a length of approximately 250 μm, and the MZ diodes 402, 404 each having a length of approximately 360 μm, and using reverse and forward biasing, it has been found that an extinction ratio of over 4 dB can be achieved at a data rate of 100 Gbits/s NRZ, and an extinction ratio as high as 7.9 dB can be achieved at a data rate of 50 Gbits/s NRZ. This compares to an extinction ratio of only approximately 2.2 dB in the MZ modulator of FIG. 1 at 50 Gbits/s NRZ, assuming that the diodes 110 and 112 are each of 50 μm in length, and the diodes 102 and 104 are each of approximately 2520 μm in length. Moreover, it has been found that an extinction ratio of over 4 dB can be achieved at a data rate of 100 Gbits/s NRZ with a similar structure with the MZI diodes 402, 404 each having a length of approximately 1000 μm.

In particular, the present inventors have found that the use of forward and reverse biasing voltages increases the phase variation between the optical paths, allowing a phase variation of up to 180° in certain cases, and also light attenuation of the low light level is increased.

While the embodiment of FIG. 4 has been described in relation with a two-level modulation scheme, in alternative embodiments additional modulation levels can be used, providing for example PAM 4 modulation or higher, as will now be described with reference to FIGS. 8, 9A, 9B and 9C.

Figure 8:
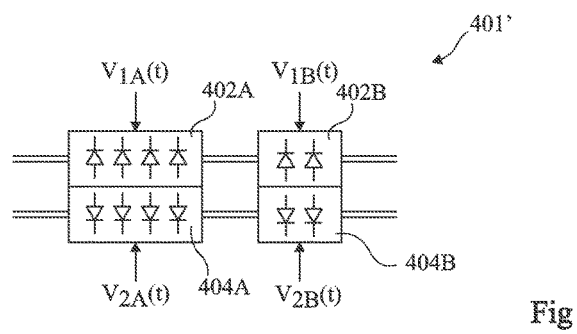
FIG. 8 schematically illustrates MZ diodes used for PAM-4 (pulse amplitude modulation) according to an example embodiment.

FIG. 8 schematically illustrates MZ diodes 401' replacing the MZ diodes 401 of FIG. 4 according to an embodiment that allows PAM 4 modulation to be implemented. In particular, the MZ diodes 402 and 404 are divided into separate portions that can be driven independently. For example, the MZ diode 402 is divided into diodes 402A, 402B, the diode 402A for example being approximately twice the length of the diode 402B. The diodes 402A, 402B are respectively controlled by voltage signals V1A(t) and V1B(t). Similarly, the MZ diode 404 is divided into diodes 404A, 404B, the diode 404A for example being approximately twice the length of the diode 404B. The diodes 404A, 404B are respectively controlled by voltage signals V2A(t) and V2B(t).

Operation of the MZ modulator 400 of FIG. 4 with the MZ diodes 401' of FIG. 8 will now be described in more detail with reference to FIGS. 9A, 9B and 9C.

Figure 9A:
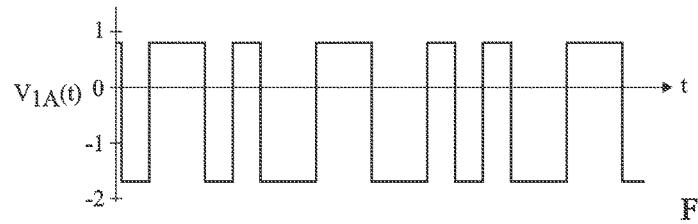
FIGS. 9A and 9B are timing diagrams illustrating examples of voltage signals applied to the MZ diodes of FIG. 8 according to an example embodiment.
Figure 9B:
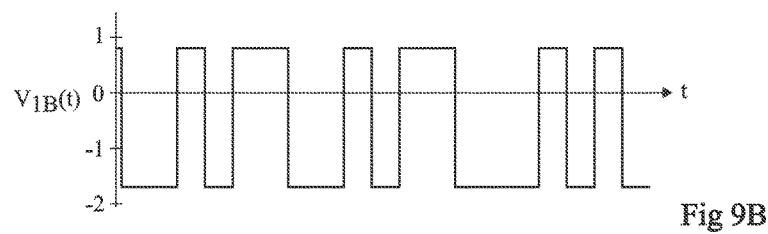

FIGS. 9A and 9B are timing diagrams illustrating examples of the voltage signals V1A(t) and V1B(t). Each of the signals V1A(t), V1B(t) for example varies between a forward biasing voltage and a reverse biasing voltage, which are for example the same levels described above with reference to FIGS. 6 and 7A. In the examples of FIGS. 9A and 9B, the forward and reverse biasing voltages are respectively equal to approximately 0.72 V and −1.8 V. For example, the following data bits are encoded using the following states of the voltage signals V1A(t), V1B(t):

"11": signals $V_{1A}(t)$ and $V_{1B}(t)$ both at the forward biasing voltage;

"10": signal V1A(t) at the forward biasing voltage, and signal V1B(t) at the reverse biasing voltage;

"01": signal V1A(t) at the reverse biasing voltage, and signal V1B(t) at the forward biasing voltage; and "00": signals V1A(t) and V1B(t) both at the reverse biasing voltage.

Figure 9C:
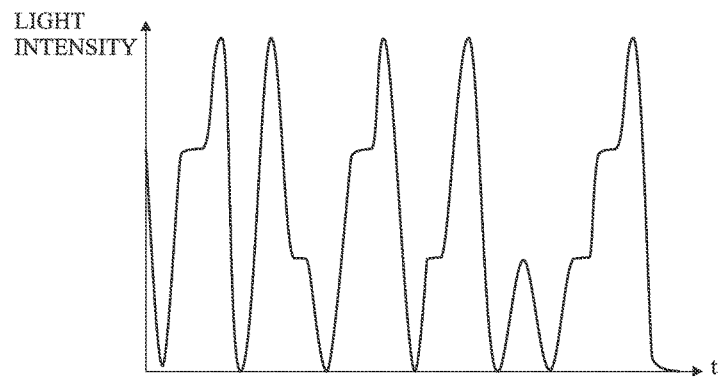
FIG. 9C is a graph showing an example of light intensity resulting from the voltage signals of FIGS. 9A and 9B according to an example embodiment.

FIG. 9C is a graph illustrating the light intensity resulting from the voltage signals of FIGS. 9A and 9B applied to the MZ diodes 402A, 402B respectively, and the inverse signals applied to the MZ diodes 404A, 404B. As illustrated, in this example, the light intensity is at one of four levels depending on the levels of the signals V1A(t), V1B(t).

Having thus described at least one illustrative embodiment, various alterations, modifications and improvements will readily occur to those skilled in the art. For example, while a particular example of an MZ modulator is described in relation with FIG. 4, it will be apparent to those skilled in the art that various modifications could be applied to this circuit, including the addition of further components. For example, it would be possible to add a phase modification device, similar to the device 108 of FIG. 1, in the optical paths P1, P2 between the optical couplers 406, 420.

Furthermore, while the example of a PAM 4 modulation scheme has been described, it will be obvious to those skilled in the art how this could be extended to PAM 8 or PAM 16 modulation schemes.

What is claimed is:

1. A Mach-Zehnder modulator (MZM) comprising:
an MZM input coupled to an input of a first optical coupler;
a first optical path coupled to a first output of the first optical coupler, the first optical path comprising a first diode coupled to a first voltage signal node and configured to modify a phase of a first light signal transmitted through the first optical path;
a second optical path coupled to a second output of the first optical coupler, the second optical path comprising a second diode coupled to a second voltage signal node and configured to modify a phase of a second light signal transmitted through the second optical path, wherein a first voltage signal carried on the first voltage signal node alternates between a forward biasing voltage level and a reverse biasing voltage level, and wherein a second voltage signal carried on the second voltage signal node alternates between a reverse biasing voltage level and a forward biasing voltage level;
a further diode positioned in the first optical path and configured to introduce a phase shift to the first light signal;
a second optical coupler comprising a first input and a second input, wherein the first optical path is coupled to the first input of the second optical coupler, and wherein the second optical path is coupled to the second input of the second optical coupler; and
an MZM output coupled to a first output of the second optical coupler.

2. The MZM of claim 1, further comprising a drive circuit coupled to the first and second voltage signal nodes and configured to generate the first and second voltage signals, wherein the drive circuit is configured to generate the forward biasing voltage level to be higher than 0 V and lower than a threshold voltage of the first and second diodes.

3. The MZM of claim 1, wherein the first and second optical paths are arranged such that, in the absence of the first and second voltage signals, the further diode provides the only phase variation, introduced by the first and second optical paths, between the first and second light signals.

4. The MZM of claim 1, wherein the first and second diodes comprise high speed phase modulation (HSPM) diodes and the further diode comprises a P-intrinsic-N phase modulation (PINPM) diode.

5. The MZM of claim 1, wherein the further diode is configured to introduce a phase shift of between 10 and 80°.

6. The MZM of claim 1, wherein the further diode is configured to introduce a phase shift of between 10 and 65°.

7. The MZM of claim 1, wherein each of the first and second diodes has a length of between 200 and 1100 μm.

8. The MZM of claim 1, wherein the further diode has a length of between 50 and 400 μm.

9. The MZM of claim 1, further comprising a bias voltage generator coupled to the further diode.

10. An optical link comprising:
the MZM of claim 1; and
an optical channel coupled to the MZM output.

11. The MZM of claim 1, further comprising:
a second further diode positioned in the second optical path and configured to introduce a phase shift of the second light signal, wherein the phase shift to the second light signal is substantially equal and opposite to the phase shift of the first light signal.

12. The MZM of claim 9, wherein the bias voltage generator is configured to generate a biasing voltage for controlling the phase shift introduced by the further diode.

13. The MZM of claim 12, wherein the bias voltage generator is configured to generate the biasing voltage based on an output signal of a second output of the second optical coupler.

14. The MZM of claim 12, wherein the bias voltage generator is configured to generate the biasing voltage based on an output signal of the first output of the second optical coupler.

15. A Mach-Zehnder modulator (MZM) comprising:
a first optical path;
a second optical path;
a first diode located in the first optical path and coupled to a first voltage signal node, wherein the first diode is designed to have a first response time;
a second diode located in the second optical path and coupled to a second voltage signal node, wherein the second diode is designed to have a second response time;
a third diode located in the first optical path and coupled to a bias voltage node, wherein the third diode is designed to have a third response time that is slower than the first and second response times; and
an optical coupler with a first input coupled to the first optical path and a second input coupled to the second optical path.

16. The MZM of claim 15, wherein a first voltage signal carried on the first voltage signal node and a second voltage signal carried on the second voltage signal node each vary between a reverse biasing voltage level and a forward biasing voltage level.

17. The MZM of claim 15, wherein the first and second diodes comprise high speed phase modulation (HSPM) diodes and the third diode comprises a P-intrinsic-N phase modulation (PINPM) diode.

18. The MZM of claim 15, wherein the third diode is configured to introduce a phase shift of between 10 and 65°.

19. The MZM of claim 15, wherein each of the first and second diodes has a length of between 200 and 1100 μm and wherein the third diode has a length of between 50 and 400 μm.

20. A method of optical modulation comprising:
applying a first light signal to a first optical path that includes a first diode of a Mach-Zehnder modulator and a further diode;
applying a second light signal to a second optical path that includes a second diode of the Mach-Zehnder modulator;
introducing a phase shift in the first light signal by biasing the further diode;
modifying a phase of the first light signal by applying a first voltage signal to the first diode, wherein the first voltage signal alternates between a reverse biasing voltage level and a forward biasing voltage level;
modifying a phase of the second light signal by applying a second voltage signal to the second diode, wherein the second voltage signal alternates between the reverse biasing voltage level and the forward biasing voltage level; and
combining the first and second light signals.

21. The method of claim 20, wherein introducing the phase shift in the first light signal comprises biasing the further diode with a bias voltage determined by a calibration procedure.

22. The method of claim 20, wherein the first and second diodes have a faster response time as compared to the further diode.

23. The method of claim 20, wherein introducing the phase shift in the first light signal comprises introducing a phase shift of between 10 and 65°.

* * * * *